(12) United States Patent
Chen et al.

(10) Patent No.: US 8,458,376 B1
(45) Date of Patent: Jun. 4, 2013

(54) USB PERIPHERAL DEVICE WITH AUTOMATIC MODE SWITCH

(75) Inventors: Johnny Chen, Santa Ana, CA (US); Ping-Shun Zeung, Santa Ana, CA (US)

(73) Assignee: I/O Interconnect Inc., Nangang Dist., Taipei (TW)

( * ) Notice: Subject to any disclaimer, the term of this patent is extended or adjusted under 35 U.S.C. 154(b) by 6 days.

(21) Appl. No.: 13/353,341

(22) Filed: Jan. 19, 2012

(51) Int. Cl.
*G06F 13/00* (2006.01)
*G06F 3/00* (2006.01)

(52) U.S. Cl.
USPC ............ 710/19; 710/2; 710/5; 710/8; 710/15; 710/29

(58) Field of Classification Search
None
See application file for complete search history.

(56) References Cited

U.S. PATENT DOCUMENTS

2010/0070659 A1* 3/2010 Ma et al. .................... 710/14

* cited by examiner

*Primary Examiner* — Scott Sun

(57) ABSTRACT

A USB peripheral device with a power connector, such as a card reader, which serves as a peripheral device when it is connected to a host device such as a smart phone, while which can directly charge the host device when a charger is plugged in, is disclosed. The peripheral device has a USB connector and a controller. The ID, D+, D− and VBUS pins of the USB connector are connected to the controller and the power connector through a plurality of relays depending upon whether the power connector is connected by a charger or not. The peripheral device can be automatically switched to serve as a B-device or a power bridge transferring power from the charger to the host device.

10 Claims, 5 Drawing Sheets

USB PERIPHERAL DEVICE WITH AUTOMATIC MODE SWITCH

BACKGROUND OF THE INVENTION

1. Technical Field

The present invention relates to USB devices, particularly to USB peripheral devices, such as card readers, for portable host devices, such as smart phones or tablet computers.

2. Related Art

USB (Universal Serial Bus) was designed to standardize the connection of computer peripherals, such as keyboards, pointing devices, digital cameras, printers, portable media players, disk drives and network adapters to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices. It can be said that USB is the most popular interface in the world.

The USB 1.x and 2.0 specifications provide a 5 V supply on a single wire from which connected USB devices may draw power. In recent years, more and more countries prescribe that all mobile phones sold in those countries are required to use the USB port as a power port. Also, many standard-setting organizations, such as the Open Mobile Terminal Platform group, the GSM Association (GSMA) and the International Telecommunication Union (ITU), announce that their members have agreed on micro-USB as the future common connector for mobile devices and a standard charger for mobile phones. The standard connector to be adopted is to be the micro-USB connector. Having a standard charger for all phones means that manufacturers will no longer have to supply a charger with every new phone. Thus the micro-USB connector is and will be a primary interface port for both communication and power charge or supply.

Generally, a portable host device, such as a mobile phone or tablet computer, is equipped with only one micro-USB port for connecting either a peripheral device or a charger. That is to say, a charger cannot be plugged in if a peripheral device has occupied the micro-USB port, and vice versa. Obviously, users have to frequently plug and unplug a peripheral device or charger. This is so inconvenient for users.

SUMMARY OF THE INVENTION

An object of the invention is to provide a USB peripheral device with automatic mode switch, which is provided with a power connector for connecting a charger. The peripheral device of the invention allows a user to connect a charger to charge the host device to which the peripheral device connects by means of automatically switching its mode depending upon connecting or disconnecting the charger.

To accomplish the above object, the USB peripheral device of the invention includes a USB connector having a VBUS pin, a D− pin, a D+ pin, an ID pin and a GND pin; a controller, connecting to the VBUS pin, the D− pin, the D+ pin and the GND pin; a power connector for connecting a charger, having a power lead for outputting power from the charger and a signal lead connected to the controller for sending a status signal indicating whether the charger is connected or not; a first relay, having two first switch contacts and a first control lead, wherein the first switch contacts are connected between the ID pin and the GND pin, and the first control lead is controlled by the signal lead of the power connector; a second relay, having two sets of second switch contacts and a second control lead, wherein a set of second switch contacts are connected between the D− pin and the controller, the other set of the second switch contacts are connected between the D+ pin and the controller, and the second control lead is controlled by the signal lead of the power connector; a third relay, having two third switch contacts and a third control lead, wherein the third switch contacts are connected between the VBUS pin and a power pin of the controller, and the third control lead is controlled by the signal lead of the power connector; a fourth relay, having two fourth switch contacts and a fourth control lead, wherein the fourth switch contacts are connected between the VBUS pin and the power lead of the power connector, and the fourth control lead is controlled by the signal lead of the power connector; and a fifth relay, having two fifth switch contacts and a fifth control lead, wherein the fifth switch contacts are connected between the power lead of the power connector and the power pin of the controller, and the fifth control lead is controlled by the signal lead of the power connector; wherein the first relay, the second relay, the third relay, the fourth relay and the fifth relay are switched on/off depending upon the status signal from the signal lead of the power connector.

DETAILED DESCRIPTION OF THE INVENTION

Figure 1:
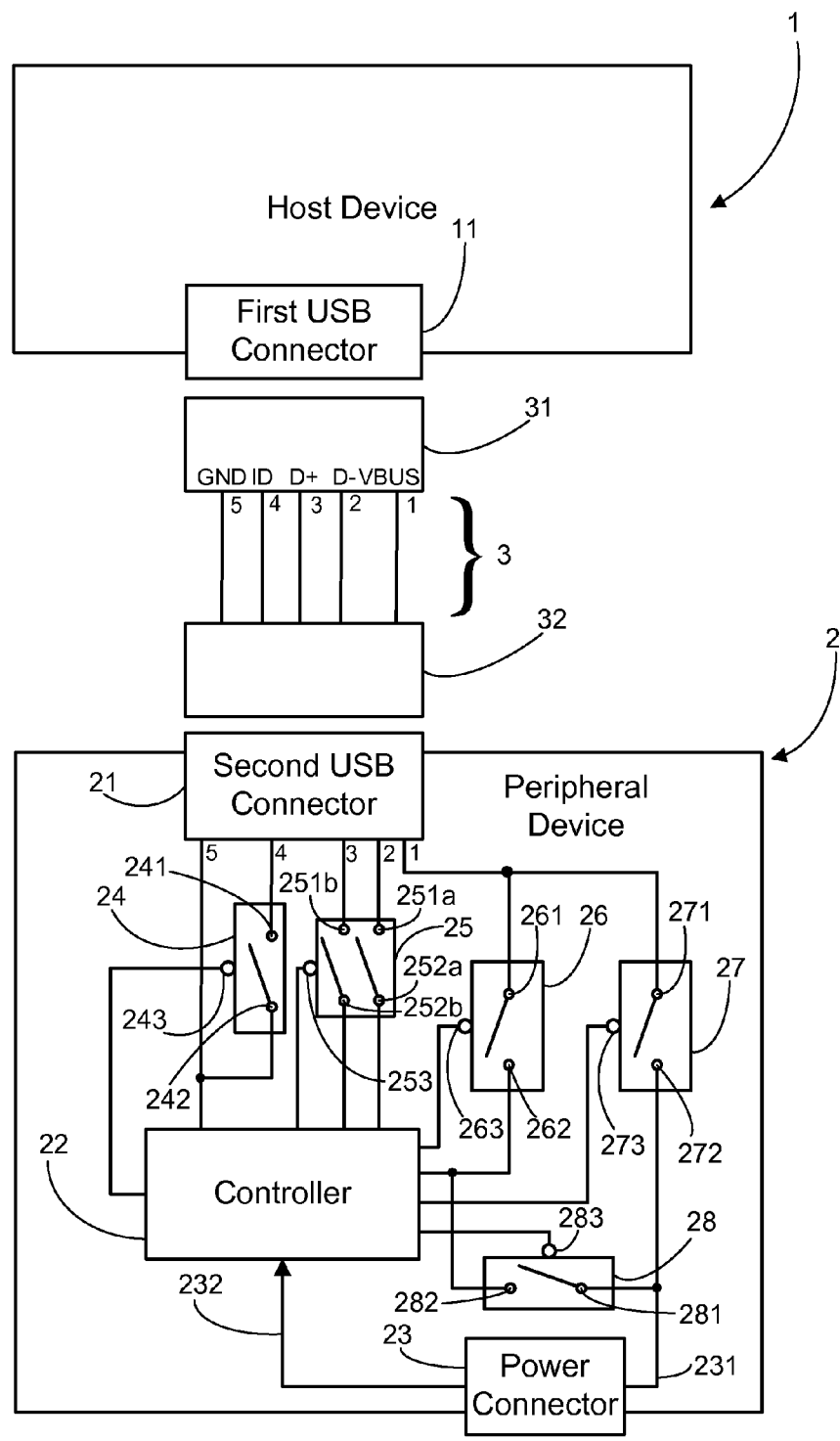
FIG. 1 is a block diagram of the invention coupled with a host device.

Please refer to FIG. 1. The peripheral device 2 of the invention may be, but not limited to, a card reader for coupling to a host device 1 such as a smart phone or tablet computer. The host device 1 and peripheral device 2 are provided with a first USB connector 11 and a second USB connector 21, respectively. The two connectors 11, 21 may be mini-USB connectors or micro-USB connectors and may be coupled by a USB cable 3 with two plugs 31, 32. In practice, the smart phone or tablet computer as the host device 1 is inherently equipped with the USB On-The-Go (OTG) function and initially operates as a host, also called as A-Device, and the peripheral device 2 coupled to the host device 1 initially operates as a peripheral, also called as B-Device.

According to the USB specification, each of the first and second USB connectors 11, 21 contains five pins, i.e., a VBUS pin (pin 1), a D− pin (pin 2), a D+ pin (pin 3), an ID pin (pin 4) and a GND pin (pin 5). The VBUS pin provides a 5V supply on a single wire from which connected USB devices may draw power. The specification provides for no more than 5.25V and no less than 4.75V (5V±5%) between the positive and negative bus power lines.

All pins of the two plugs 31, 32 are separately correspondingly connected with each other. Alternatively, the second USB connector 21 may be directly connected to the first USB connector 11 without using the USB cable 3.

The peripheral device 2 further includes a controller 22, a power connector 23, a first relay 24, a second relay 25, a third relay 26, a fourth relay 27 and a fifth relay 28 besides the second USB connector 21. The controller 22 can control the five relays 24, 25, 26, 27 and 28 depending upon a status of the power connector 23. Of course, there must be other components for performing one or more inherent functions in the peripheral device, for example, one or more memory card receptacles for receiving memory cards and LEDs for indicating a card reading/writing status, which electrically connects to the controller 22, when the peripheral device 2 is a card reader. For the sake of simplification and clarity, however, such components are omitted from the drawings.

Figure 3:
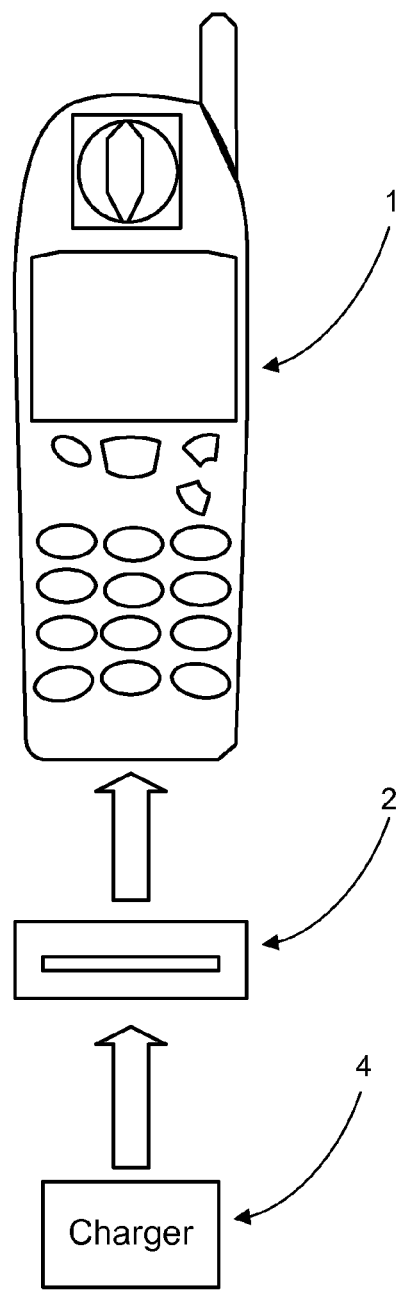
FIG. 3 is a schematic view illustrating the invention is coupled between a smart phone and a charger.

The power connector 23 is used for connecting an external charger 4 (shown in FIG. 3). The power connector 23 has a power lead 231 for outputting power and a signal lead 232 connected to the controller 22 for sending a status signal indicating whether the charger 4 is connected or not. Approaches of detecting whether the charger is connected or not may be electronic or mechanical. For example, a typical electronic approach is to transfer the power from the charger to the controller 22 as the status signal and a typical mechanical approach is to dispose a micro switch in the power connector 23 for sensing a power plug of the charger. Thus, the controller 22 can know whether the charger is connected into the power connector 23 or not.

The first relay 24 has two first switch contacts 241, 242 and a first control lead 243. The first switch contacts 241, 242 are connected between the ID pin and the GND pin of the second USB connector 21. The first control lead 243 is connected to the controller 22 to make the first relay be under the control of the controller 22. The second relay 25 is of a DPST (double pole single throw) type, which has a second control lead 253 connected to the controller 22 and two sets of second switch contacts 251a, 252a; 252a, 252b. One set of the second switch contacts 251a, 252a are connected between the D– pin and the controller 22, and the other set of the second switch contacts 251b, 252b are connected between the D+ pin and the controller 22.

The third relay 26 has two third switch contacts 261, 262 and a third control lead 263. The third control lead 263 is connected to the controller 22. The third switch contacts 261, 262 are connected between a power pin of the controller 22 and the VBUS pin of the second USB connector 21. Similarly, the fourth relay 27 has two fourth switch contacts 271, 272 and a fourth control lead 273. The fourth control lead 273 is connected to the controller 22. The fourth switch contacts 271, 272 are connected between the power lead 231 of the power connecter 23 and the VBUS pin of the second USB connector 21. The fifth relay 28 has two fifth switch contacts 281, 282 and a fifth control lead 283. The fifth control lead 283 is connected to the controller 22. The fifth switch contacts 281, 282 are connected between the power lead 231 of the power connecter 23 and the power pin of the controller 22. One, more or all of the relays 24, 25, 26, 27 and 28 may be of an electronic type or a mechanical type and under control of the controller 22.

By the status signal from the power connector 23 to the controller 22 through the signal lead 232, the controller 22 can control the five relays 24, 25, 26, 27 and 28 through the five control leads 243, 253, 263, 273 and 283 to close (i.e. short) or open the switch contacts 241, 242; 251a, 252a; 251b, 252b; 261, 262; 271, 272 and 281, 282. As a result, the controller 22 can be powered by either the VBUS pin of the second USB connector 21 or the power lead 231 of the power connector 23. These relays 24-28 are controlled by the controller 22 into three stages, and the relays 24-28 are separately switched on or off during the three stages as follows:

|  | 1st Relay | 2nd Relay | 3rd Relay | 4th Relay | 5th Relay |
| --- | --- | --- | --- | --- | --- |
| Stage 1 | ON | ON | ON | OFF | OFF |
| Stage 2 | OFF | OFF | OFF | OFF | ON |
| Stage 3 | OFF | OFF | OFF | ON | ON |

Figure 2:
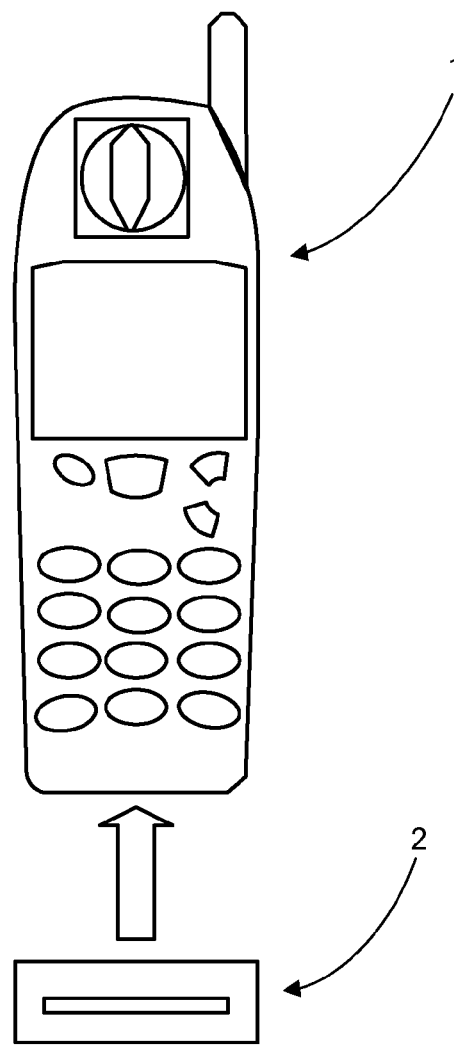
FIG. 2 is a schematic view illustrating the invention is coupled to a smart phone as a host device.

Stage 1 is when the peripheral device 2 is connected to the host device 1 without connecting the charger as shown in FIG. 2. Stage 2 is while the charger is connecting the power connector 23 of the peripheral device 2 which has connected to the host device 1 as shown in FIG. 3. Stage 3 is when the charger has connected to the peripheral device 2 without removing the peripheral device 2 from the host device 1 as shown in FIG. 3.

Stage 1 is an initial period. As shown in FIG. 2, the peripheral device 2 of the invention, for example a card reader, may be connected to a smart phone as the host device 1 without connecting a charger. During stage 1, the first relay 24, the second relay 25 and the third relay 26 are switched on and the other relays 27 and 28 are switched off by the controller 22, which makes the controller 22 powered by the VBUS pin of the second USB connector 21 through the third relay 26 and makes the host device 1 and the peripheral device 2 serve as an A-device and a B-device, respectively. That is to say, the peripheral device 2 is under control of and powered by the host device 1 so that the peripheral device 2 can perform its inherently peripheral function(s).

During stage 2 as shown in FIG. 3, only the fifth relay 28 is switched on and the other relays 24-27 are switched off, which makes the controller 22 powered by the power lead 231 of the power connector 23 through the fifth relay 28 and makes the second USB connector 21 simulate a removal action from the host device 1, which results from the opened ID pin, D– pin and D+ pin of the second USB connector 21. Stage 2 lasts for a considerably short time and can be deemed as a safety period in transition of the power of the controller 22.

During stage 3 as shown in FIG. 3, the peripheral device 2 of the invention may directly connect a charger 4 with the power connector 23 without disconnecting the peripheral device 2 from the host device 1 to charge a smart phone as the host device 1, the fourth relay 27 and the fifth relay 28 are switched on and the first relay 24, the second relay 25 and the third relay 26 are switched off, which makes the controller 22 powered by the power lead 231 of the power connector 23 through the fifth relay 28 and makes the host device 1 charged or powered by the charger 4 through the power connector 23. At this time, the peripheral device 2 is to serve as a power bridge transferring power from the charger 4 to the host device 1 with disabling its inherently peripheral function(s) because the ID pin of the second USB connector 21 is shorted to the GND pin to be grounded. The grounded ID pin of the second USB connector 21 will force the host device 1 into a charge mode.

In sum, the peripheral device 2 performs its inherent function(s) when it is connected to the host device 1 without connecting the charger 4, while the peripheral device 2 serves a power bridge when it is connected the host device 1 with connecting the charger 4. That is, a user can charge the host device 1 without removing the peripheral device 2 from the host device 1.

Figure 4:
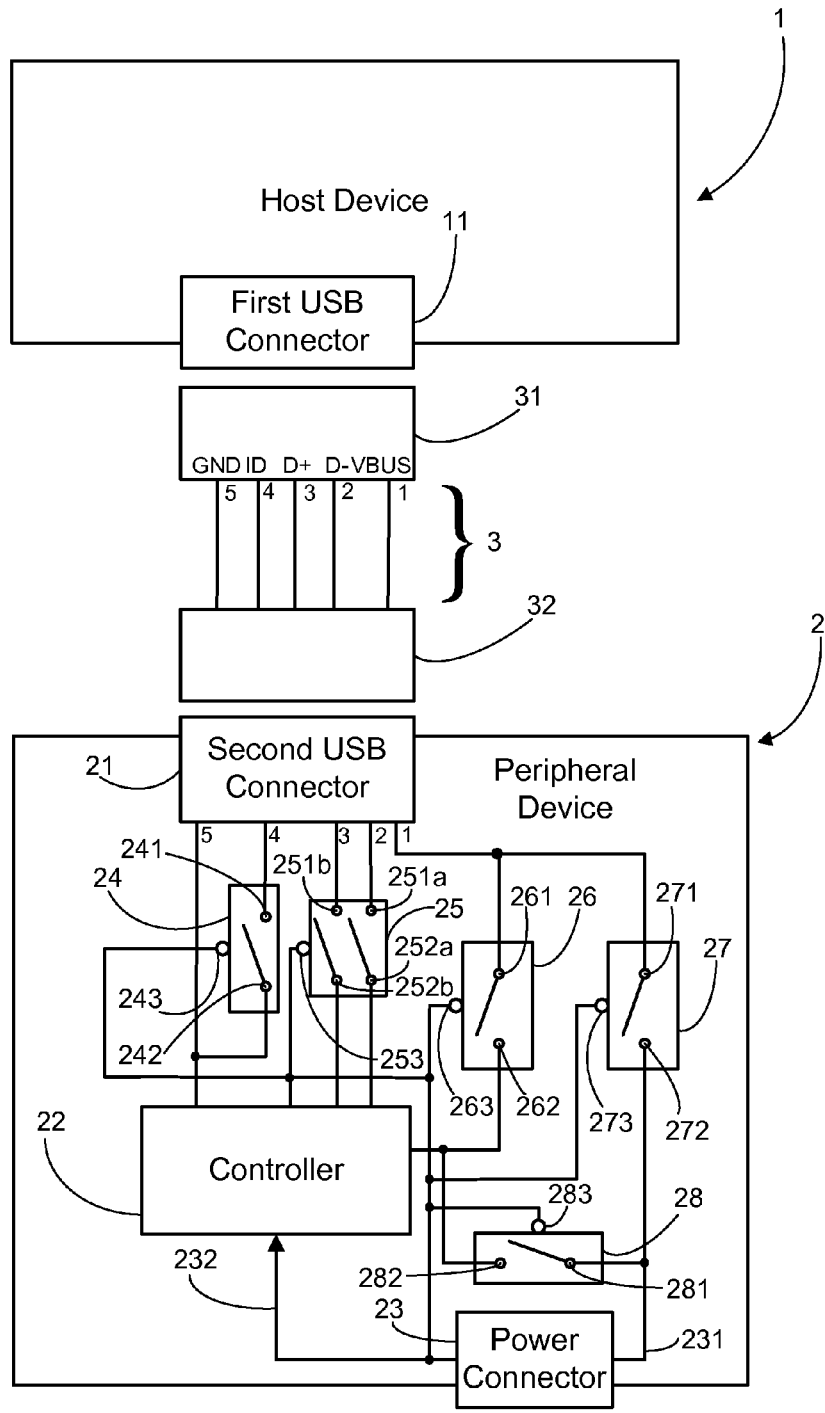
FIG. 4 is a block diagram of another embodiment of the invention coupled with a host device.

In the above embodiment, the relays 24-28 are indirectly controlled by the signal lead 232 of the power connector 23 through the controller 22. Alternatively, all the relays 24-28 can be directly controlled by the signal lead 232 of the power connector 23 by connecting the signal lead 231 with the control leads 243, 253, 263, 273 and 283 as shown in FIG. 4.

Figure 5:
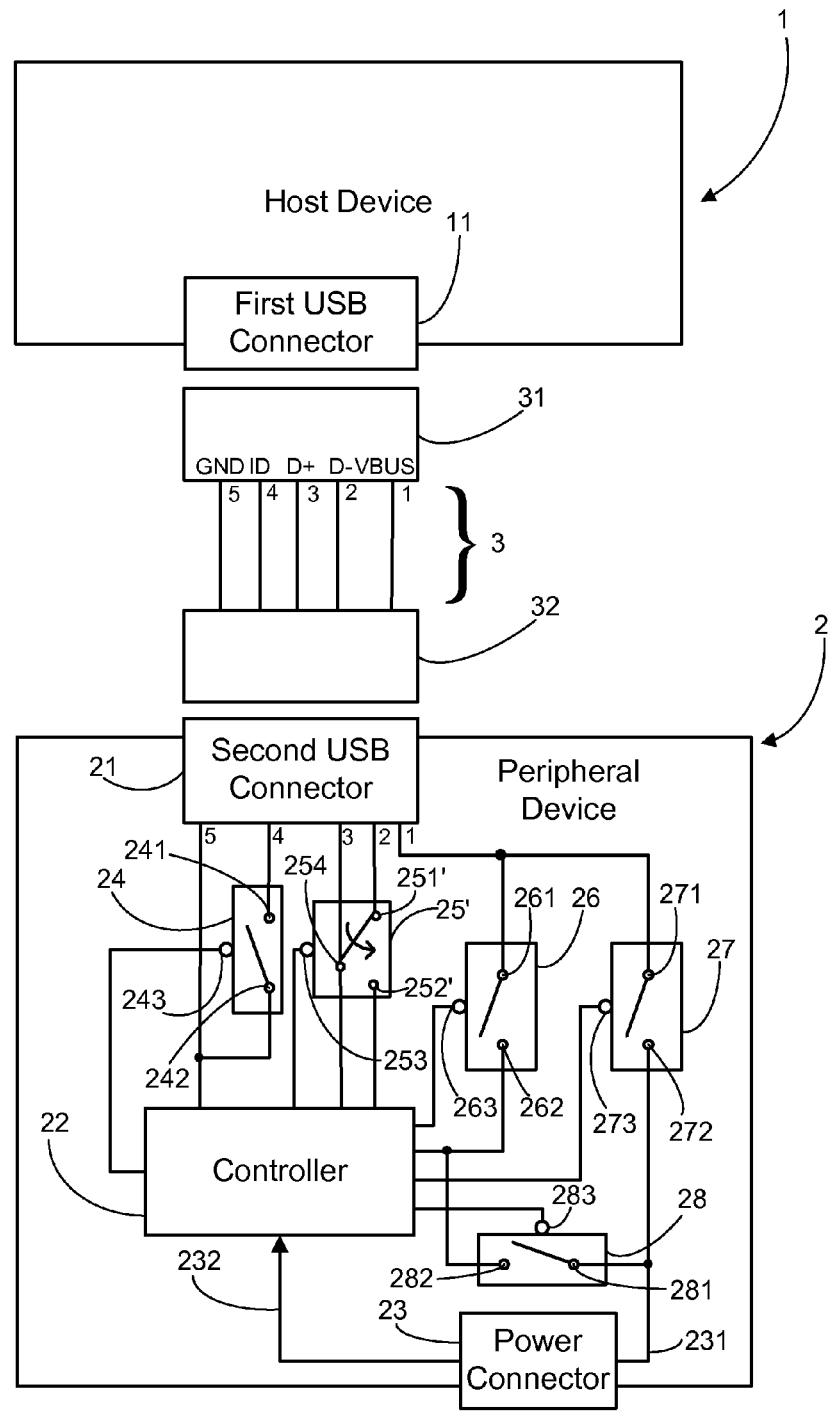
FIG. 5 is a block diagram of still another embodiment of the invention coupled with a host device.

FIG. 5 shows another embodiment of the invention. In this embodiment, the second relay 25' is of a SPDT (Single Pole Double Throw) type and has a second control lead 253 connected to the controller 22, a common contact 251' and two switch contacts 252', 254. The common contact 251' and the first switch contact 252' are connected between the D− pin and the controller 22. The second switch contact 254 is on the wire connecting the D+ pin and the controller 22. During stages 1 and 2, the second relay 25' is switched to connect the common contact 251' and the first switch contact 252'. During stage 3, the second relay 25' is switched to connect the common contact 251' and the second switch contact 254, i.e. D− pin is shorted to D+ pin.

It will be appreciated by persons skilled in the art that the above embodiment has been described by way of example only and not in any limitative sense, and that various alterations and modifications are possible without departure from the scope of the invention as defined by the appended claims.

What is claimed is:

1. A universal serial bus (USB) peripheral device comprising:
   a USB connector having a VBUS pin, a D− pin, a D+ pin, an ID pin and a GND pin;
   a controller, connecting to the VBUS pin, the D− pin, the D+ pin and the GND pin;
   a power connector for connecting a charger, having a power lead for outputting power from the charger and a signal lead connected to the controller for sending a status signal indicating whether the charger is connected or not;
   a first relay, having two first switch contacts and a first control lead, wherein the first switch contacts are connected between the ID pin and the GND pin, and the first control lead is controlled by the signal lead of the power connector;
   a second relay, having two sets of second switch contacts and a second control lead, wherein a set of second switch contacts are connected between the D− pin and the controller, the other set of the second switch contacts are connected between the D+ pin and the controller, and the second control lead is controlled by the signal lead of the power connector;
   a third relay, having two third switch contacts and a third control lead, wherein the third switch contacts are connected between the VBUS pin and a power pin of the controller, and the third control lead is controlled by the signal lead of the power connector;
   a fourth relay, having two fourth switch contacts and a fourth control lead, wherein the fourth switch contacts are connected between the VBUS pin and the power lead of the power connector, and the fourth control lead is controlled by the signal lead of the power connector; and
   a fifth relay, having two fifth switch contacts and a fifth control lead, wherein the fifth switch contacts are connected between the power lead of the power connector and the power pin of the controller, and the fifth control lead is controlled by the signal lead of the power connector;
   wherein the first relay, the second relay, the third relay, the fourth relay and the fifth relay are switched on/off depending upon the status signal from the signal lead of the power connector.

2. The USB peripheral device of claim 1, wherein the first, second, third, fourth and fifth relays are of a mechanical type.

3. The USB peripheral device of claim 1, wherein the first, second, third, fourth and fifth relays are of an electronic type.

4. The USB peripheral device of claim 1, wherein the first, second, third, fourth and fifth control leads are connected to the controller, and the controller is configured to control the first relay, the second relay, the third relay, the fourth relay and the fifth relay depending upon the status signal from the signal lead of the power connector.

5. The USB peripheral device of claim 1, wherein the first, second, third, fourth and fifth control leads are connected to the signal lead of the power connector.

6. The USB peripheral device of claim 1, wherein the USB peripheral device is a card reader.

7. The USB peripheral device of claim 1, wherein when the USB connector is connected to a host device and the power connector is not connected by a charger, the first relay, the second relay and the third relay are switched on and the other relays are switched off, so that the controller is powered by the VBUS pin of the second USB connector through the third relay and the host device and the peripheral device serve as an A-device and a B-device, respectively.

8. The USB peripheral device of claim 7, wherein while the charger is connecting the power connector and the USB connector has connected to the host device, the fifth relay is switched on and the other relays are switched off, so that the controller is powered by the power lead of the power connector through the fifth relay and the USB connector simulates a removal action from the host device.

9. The USB peripheral device of claim 8, wherein when the charger has connected to the power connector without removing the peripheral device from the host device, the fourth relay and the fifth relay are switched on and the first relay, the second relay and the third relay are switched off, so that the controller is powered by the power lead of the power connector through the fifth relay and the host device is charged or powered by the charger through the power connector.

10. A universal serial bus (USB) peripheral device comprising:
    a USB connector having a VBUS pin, a D− pin, a D+ pin, an ID pin and a GND pin;
    a controller, connecting to the VBUS pin, the D− pin, the D+ pin and the GND pin;
    a power connector for connecting a charger, having a power lead for outputting power from the charger and a signal lead connected to the controller for sending a status signal indicating whether the charger is connected or not;
    a first relay, having two first switch contacts and a first control lead, wherein the first switch contacts are connected between the ID pin and the GND pin, and the first control lead is controlled by the signal lead of the power connector;
    a second relay, having a second control lead connected to the controller, a common contact two switch contacts, wherein the common contact and one of the switch contacts are connected between the D− pin and the controller, the other switch contact is on a wire connecting the D+ pin and the controller;
    a third relay, having two third switch contacts and a third control lead, wherein the third switch contacts are connected between the VBUS pin and a power pin of the controller, and the third control lead is controlled by the signal lead of the power connector;
    a fourth relay, having two fourth switch contacts and a fourth control lead, wherein the fourth switch contacts are connected between the VBUS pin and the power lead of the power connector, and the fourth control lead is controlled by the signal lead of the power connector; and a fifth relay, having two fifth switch contacts and a fifth control lead, wherein the fifth switch contacts are connected between the power lead of the power connector and the power pin of the controller, and the fifth control lead is controlled by the signal lead of the power connector;

wherein the first relay, the second relay, the third relay, the fourth relay and the fifth relay are switched on/off depending upon the status signal from the signal lead of the power connector.

\* \* \* \* \*